US012811396B2

(12) United States Patent
Agarwal et al.

(10) Patent No.: US 12,811,396 B2
(45) Date of Patent: Nov. 24, 2026

(54) LOAD CONTROLLER WITH SMART RELAY MODULE

(71) Applicant: Enphase Energy, Inc., Petaluma, CA (US)

(72) Inventors: Sandeep Agarwal, Fremont, CA (US); Nick Soleil, Santa Rosa, CA (US); Sreenivash K G, Murugeshpalaya (IN); Aravind Hulisandra Sathyanarayana Rao, Bangalore (IN); Rajiv Thomas, Bangalore (IN); Amit Chaturvedi, Thane (IN)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 18/380,815

(22) Filed: Oct. 17, 2023

(65) Prior Publication Data

US 2024/0128750 A1 Apr. 18, 2024

(30) Foreign Application Priority Data

Oct. 17, 2022 (IN) ............................ 202211059068

(51) Int. Cl.

| | |
|---|---|
| ***H02J 3/007*** | (2026.01) |
| ***H02J 3/32*** | (2006.01) |
| *H01H 71/02* | (2006.01) |
| *H02J 101/24* | (2026.01) |
| *H02J 103/35* | (2026.01) |
| *H02J 105/50* | (2026.01) |

(52) U.S. Cl.

CPC ................ *H02J 3/007* (2020.01); *H02J 3/32* (2013.01); *H01H 71/0228* (2013.01); *H02J 2101/24* (2026.01); *H02J 2103/35* (2026.01); *H02J 2105/51* (2026.01)

(58) Field of Classification Search

CPC .......... H02J 3/007; H02J 3/32; H02J 2203/10; H02J 2300/24; H02J 2310/58

See application file for complete search history.

(56) References Cited

U.S. PATENT DOCUMENTS

| | | | | |
|---|---|---|---|---|
| 2014/0204493 | A1 | 7/2014 | Bezawada et al. | |
| 2016/0226254 | A1 | 8/2016 | Cheng et al. | |
| 2020/0136385 | A1 | 4/2020 | Thornton et al. | |
| 2022/0216728 | A1 * | 7/2022 | Ashman ............ | H02J 13/00002 |
| 2022/0319789 | A1 | 10/2022 | Grossberg et al. | |

FOREIGN PATENT DOCUMENTS

| | | | | |
|---|---|---|---|---|
| CN | 102895026 A * | 1/2013 | ......... | A61B 18/1233 |
| WO | WO 2010-045790 A1 | 4/2010 | | |

OTHER PUBLICATIONS

PCT International Search Report and Written Opinion for application No. PCT/US2023/035204 dated Jan. 29, 2024, 10 pgs.

* cited by examiner

*Primary Examiner* — Daniel Cavallari
(74) *Attorney, Agent, or Firm* — Moser Taboada

(57) ABSTRACT

Methods and systems which use a load controller with a smart relay module are provided herein. For example, an apparatus for controlling one or more loads in an energy management system comprises a load controller configured to connect to a system controller and a storage system of the energy management system and a smart relay module comprising single phase relays and configured to control at least one of a single phase circuit, a split phase circuit, or a three phase circuit and configured to measure at least one of current. voltage, power, or energy for each relay load.

18 Claims, 5 Drawing Sheets

LOAD CONTROLLER WITH SMART RELAY MODULE

CROSS-REFERENCE TO RELATED APPLICATIONS

The present application claims the benefit of and priority to Indian Provisional Application Serial No. 202211059068, filed on Oct. 17, 2022, the entire contents of which is incorporated herein by reference.

BACKGROUND

Field

Embodiments of the present disclosure generally relate to distributed energy generation systems and, for example, to methods and apparatus which use a load controller with a smart relay module.

Description of the Related Art

An energy management system provides an innovative solution to a main panel upgrade (MPU) by connecting additional photovoltaics (PVs) and storage system(s) to a smart switch (microgrid interconnect device (MID)), e.g., as opposed to the main panel, thus avoiding the MPU for whole home and subpanel backup systems. With respect to whole home backup, for example, the smart switch is connected between the utility meter and the main panel with an over current protection device that limits the amount of current that can flow to the main panel, thus avoiding the MPU. For the subpanel backup, an installer can move as many load circuits as possible from the main panel to the sub-panel.

Additionally, there is a growing market for products that combine energy and backup power management, e.g., by integrating circuit level load monitoring with load control. Both product cost and installation time, however, are limiting the adoption of this category of products.

Therefore, there is a need for improved methods and apparatus which use a load controller with a smart relay module.

SUMMARY

Embodiments disclosed herein provide methods and apparatus which use a load controller with a smart relay module. For example, an apparatus for controlling one or more loads in an energy management system comprises a load controller configured to connect to a system controller and a storage system of the energy management system and a smart relay module comprising single phase relays and configured to control at least one of a single phase circuit, a split phase circuit, or a three phase circuit and configured to measure at least one of current. voltage, power, or energy for each relay load.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure comprise methods and apparatus which use a load controller with a smart relay module. For example, in at least some embodiments, a load controller can be a component of a backup system, but the load controller can be a separate component of a backup system and configured for use with or without a backup system. That is, the load controller can be agnostic to such environments, and could be installed and configured for providing monitoring and/or control in the absence of a storage system of a backup system, or a broader storage and/or local power production system. For example, if used in conjunction with a broader system, the load controller is capable of making autonomous decisions and is capable of detecting when a home is off-grid, on-grid, or undergoing blackstart. For example, in at least some embodiments, a house without a storage system and/or a smart switch can take advantage of the load controller described herein through a cloud-based interface. Additionally, the load controller described herein can be configured for use with one or more third-party storage systems and/or energy management systems. For example, an apparatus for controlling one or more loads in an energy management system can comprise a load controller configured to connect to a system controller and/or a storage system of the energy management system and a smart relay module comprising single phase relays and configured to control at least one of a single phase circuit, a split phase circuit, or a three phase circuit and configured to measure at least one of current. voltage, power, or energy for each relay load. The methods and apparatus described herein enable whole house backup and provide intelligence into customer load usage behavior, enable faster installation with standardized workflows, less customer calls due to backup grid collapse or customer expectations regarding duration of power during an outage, provide relatively easy servicing and commissioning of the apparatus, and provide higher flexibility and control over an energy management system during an outage, as well as offering multiple revenue streams during grid-tied operation with a short payback period.

Figure 1:
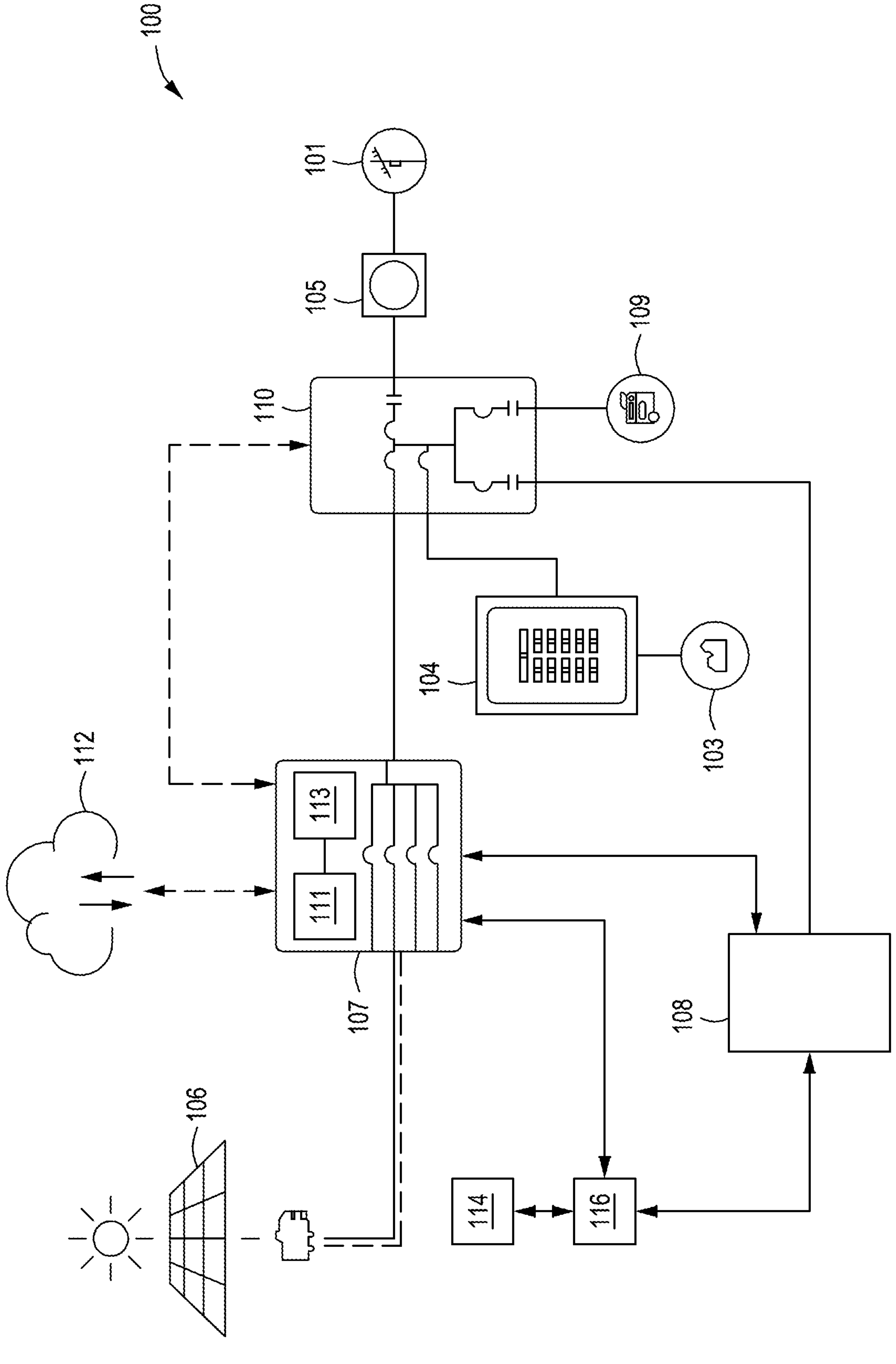
FIG. 1 depicts a block diagram of an energy management system, in accordance with at least one embodiment of the present disclosure.

FIG. 1 is a diagram of a backup configuration supported by an energy management system 100, in accordance with at least some embodiments of the present disclosure.

In at least some embodiments, the energy management system 100 can be provided as a kit. For example, for grid-tied PV only, for grid-tied PV and storage, and/or for a grid-agnostic energy management systems, one or more of the PVs, one or more batteries (e.g., a single-phase (SP) battery and/or a three-phase (3P) battery), a smart switch, a combiner/gateway, cables and/or accessories can be provided in the kit. Additionally, two main breakers for a supply side and a load side connection of the smart switch, and circuit breakers for connection of PVs and storage systems can also be provided in the kit.

Continuing with FIG. 1, in at least some embodiments, the energy management system 100 comprises one or more electronic devices—e.g., a storage system 108, a smart switch 110 (e.g., transfer switch), a combiner 107 including a wireless adaptor, which can be a USB dongle that connects to a communication gateway, one or more PVs 106 (e.g., solar panels), a system controller 114, a load controller 116 (e.g., configured for use with the energy management system 100), and a tertiary control 112 (e.g., cloud-based tertiary control using application programming interface (API)), which can provide over-the-air firmware upgrade.

The PVs 106 can be coupled in a one-to-one correspondence to a plurality of power converters, which can be a bi-directional power converter. The plurality of power converters convert DC power received from a corresponding PV and the storage system 108 to grid-compliant AC power and couple the generated AC power to the main panel 104 via the smart switch 110. The main panel 104 couples the generated power to one or more appliances (one or more loads) and/or a power grid, such as a local power grid or a commercial power grid. In other embodiments, the power converters may be coupled to the appliance(s), grid, and/or a local controller without the use of the main panel 104.

The combiner 107 can connect/communicate with the smart switch 110, the system controller 114, the load controller 116, and the storage system 108 via a wireless connection (or wired connection, such as an AC power wire) and with the Internet and/or cloud via Wi-Fi or cellular connections. For example, the combiner 107 comprises the communication gateway to which the wireless adaptor connects and communicates with the smart switch 110, the system controller 114, the load controller 116, the storage system 108, and the Internet and/or cloud. The combiner 107 connects to the PVs 106 and can communicate with the PVs 106 via a power line communication (PLC) over an AC power wire, and the other components of the energy management system 100 can connect to each other via the AC power wire. For example, the combiner 107 may retrieve data from the power converters, send commands to the power converters, and perform similar functions with respect to the PVs 106.

The combiner 107 can comprise a memory 111 that comprises one or more forms of non-transitory computer readable storage medium including one or more of, or any combination of, read-only memory or random-access memory. The memory 111 stores software (e.g., instructions) and data including, for example, an operating system, a servicing module, a communications module and data. The operating system may be any form of operating system such as, for example, Apple iOS, Microsoft Windows, Apple macOS, Linux, Android or the like. The servicing module may be software that, when executed by a processor 113, is capable of installing one or more devices of the energy management system 100, in accordance with embodiments of the disclosure described herein. The communication module may be software that, when executed by the processor 113, enables communication between the combiner 107 and one or more devices of the energy management system 100. A combiner that is suitable for use with the energy management system 100 is the IQ® line of combiners available from Enphase Energy, Inc., from Petaluma, California.

In at least some embodiments, the energy management system 100 of FIG. 1 can be configured as a whole home backup (or partial home backup and subpanel backup) with the smart switch 110 of the energy management system 100 located at a service entrance (e.g., connected to a meter 105 which is connected to a utility grid 101). A user can back up a main panel 104 (e.g., Siemens MC3010131200SECW or MC122461125SEC, GE 200 Amp 20/40, and the like), which connects to one or more loads 103 (e.g., critical loads or backup loads). In such an embodiment, the smart switch 110 can support up to an 80A breaker for the PVs 106 connected to the combiner 107 (e.g., PV combiner, (solar)) and an 80A breaker for a battery storage circuit (e.g., for the storage system 108). When an existing combiner 107 is connected to the main panel 104, a user can keep the combiner 107 connected to the main panel 104, connect only the storage system 108 to the smart switch 110, and the space in the smart switch 110 for the combiner 107 can be left vacant and used for additional battery storage.

The storage system 108 is part of the energy management system 100 and is configured to participate in grid services, such as capacity and demand response. The storage system 108 is durable NEMA type 3R outdoor rated. The storage system 108 is configured as a modular AC-coupled battery storage system with time-of-use (ToU) and backup capability, which allows for easy installation.

Additionally, the storage system 108 connects to the smart switch 110 and the combiner 107 and is configured to provide backup power when installed in a home or at a site. The storage system 108 includes one or more of a SP battery (120V) or a 3P battery (240V) (e.g., three SP batteries connected to each other, hereinafter 3P battery), which include corresponding internal microinverters, that are connected to (or integrated with) the PVs 106. The storage system 108 can be configured to detect when it is optimal to charge or discharge the SP battery and/or the 3P battery so that energy can be stored therein when energy is abundant and used when scarce.

Moreover, the storage system 108 is configured to self-protect against low state of charge (e.g., <1%) of battery packs, or cell voltages remaining in extreme low warning region. For example, the storage system 108 is configured to shut down an AC bus and/or DC bus to prevent cell discharge of the SP battery and/or the 3P battery when required.

In embodiments, the storage system 108 is configured to send notification alerts via, for example, the combiner 107 to a user. The notification, for example, can be suitable text indicating that the state of charge of the cells of the SP battery or the 3P battery are low, e.g., very low state of charge of the battery cells. Other text can also be used to alert a user. The alerts can also be available to a user and/or a technician or customer service representative to enable proactive appropriate preventive measures to avoid damage to the SP battery and/or the 3P battery. Moreover, the storage system 108 includes suitable energy reserve to self-protect against extremely low state of charge of battery cells of the SP battery and/or the 3P battery due to self-discharge losses of the storage system, e.g., for at least seven days after a notification is sent to a user, technician, and/or customer service representative. In at least some embodiments, the storage system 108 is configured to allow a user to set a remaining state of charge for each day.

The system controller 114 connects to the load controller 116 and is configured to control loads or shed excess solar circuits. For example, the system controller 114 connects to the load controller 116 and enables control of up to one or more loads (e.g., two heavy loads) or shedding of one or more solar circuits (e.g., up to two solar circuits (PV)) when operating in an off-grid mode. For example, the load controller 116 can be configured for controlling heavy, split-phase loads, or for solar circuit shedding when solar power exceeds allowed solar to storage ratios. In at least some embodiments, heavy loads can be defined as loads that exceed the power or surge capabilities of the energy management system 100. In at least some embodiments, the load controller 116 supports control of split-phase loads i.e., loads wired L1-L2 and running at 240V nominal AC voltage. Additionally, in at least some embodiments, the system controller 114 (and the system controller 114) can be an outdoor-rated, NRTL-certified NEMA type 4X enclosure with a DIN rail that contains two contactors, a power supply, wire for control connections and other wiring accessories.

Figure 2:
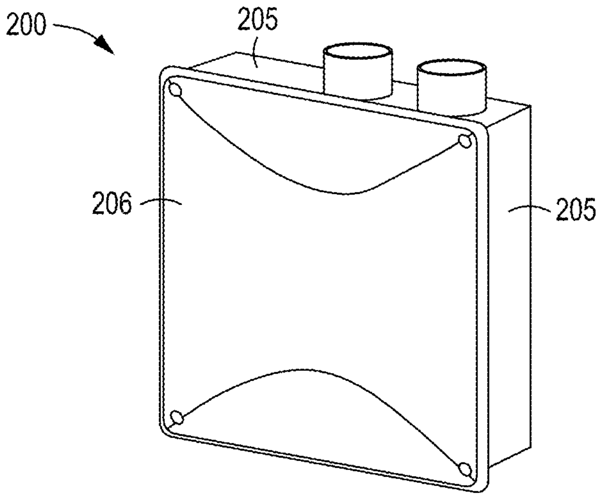
FIG. 2 is a diagram of a load enclosure configured for use with the energy management system of FIG. 1, in accordance with at least one embodiment of the present disclosure.
Figure 3:
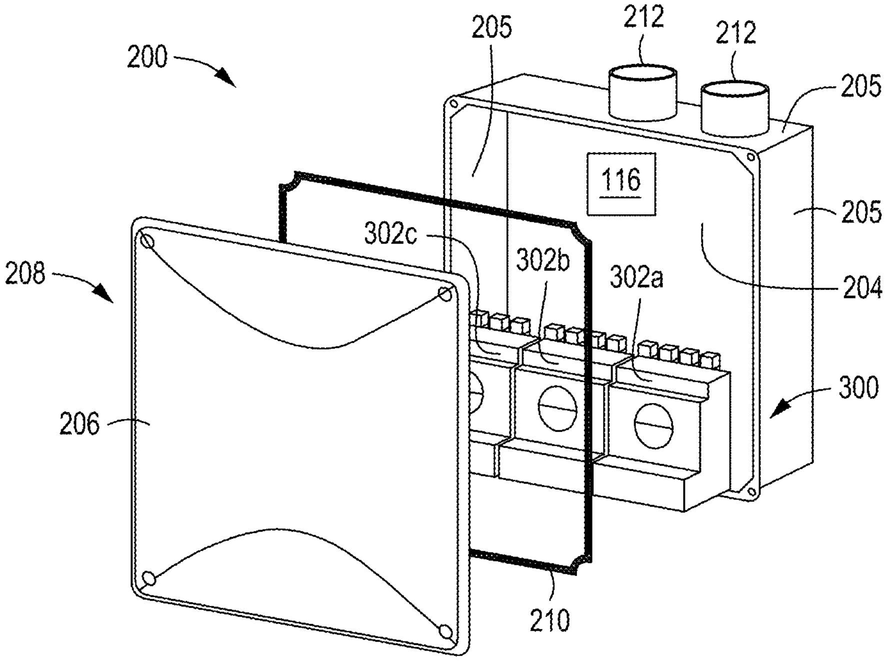
FIG. 3 is an exploded view of the load enclosure of FIG. 2, in accordance with at least one embodiment of the present disclosure.

FIG. 2 is a diagram of a load enclosure 200 configured for use with the energy management system 100 of FIG. 1, and FIG. 3 is an exploded view of the load enclosure 200 of FIG. 2, in accordance with at least one embodiment of the present disclosure. The load enclosure 200 can be at least one of a wall mount or a flush mount, houses the load controller 116, and is configured with a modular approach using one or more smart relay modules (SRM) (FIG. 3), which are components of the load controller 116. For example, the SRM 300 can be scaled up/down to accommodate a number of circuits that are provided in a panel (e.g., the main panel 104), which can save considerable product cost. In at least some embodiments, the SRM 300 can comprise three SRM 302*a*-302*c*.

The three SRM 302*a*-302*c* are connected to a back wall 204 (e.g., via one or more suitable connection devices—such as screws (not shown)) of the load enclosure 200. Four opposing sidewalls 205 connected to or formed with the back wall 204 connect to a cover or detachable lid 206 via one or more screws 208, thus making the detachable lid 206 capable of being rotated if an orientation of the load enclosure 200 is changed. The back wall 204 and four opposing sidewalls 205 define a portion of an interior volume of the load enclosure 200 when the detachable lid 206 is connected to the four opposing sidewalls 205. In at least some embodiments, a gasket 210 (or other suitable sealing device) can positioned between the detachable lid 206 and the four opposing sidewalls 205.

Additionally, the load enclosure 200 is configured to support conduit entry (cable entry), e.g., from the system controller 114, the combiner 107, the smart switch 110, the storage system 108, the main panel 104, the one or more loads 103, etc. For example, the load enclosure 200 can support conduit entry through either of the opposing sidewalls 205, the detachable lid 206, and/or the back wall 204. In at least some embodiments, separate conduit entry can be provided via a pair of apertures/posts 212 that are disposed on a top one of the opposing sidewalls 205. In at least some embodiments, the pair of apertures/posts 212 can be configured for respectively receiving current transformer (CT) conduits (current transformer wiring), voltage transformer conduits (voltage transformer wiring), power conduits (power wiring), and or circuitry (e.g., from up to eight additional circuits), which can be field wired by a user (e.g., an installer). In at least some embodiments, sufficient bend radius is provided at the apertures/posts 212 for ease of field wiring (e.g., for 6 AWG wires needed for 60 A branch circuits). By having multiple tiers of flexibility of installation, along with a small enclosure form factor of the load enclosure 200, installers can considerably reduce installation time by choosing the optimal orientation for each site.

Figure 4:
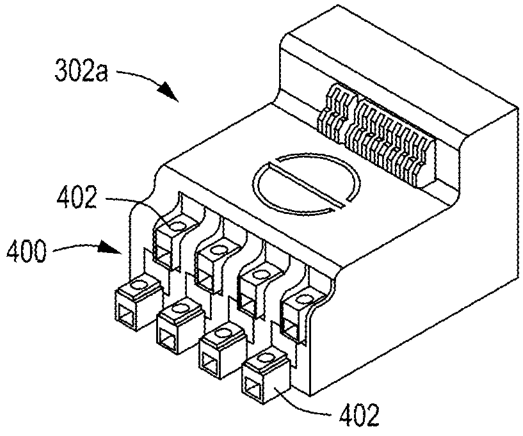
FIG. 4 is a diagram of a smart relay module configured for use with the load enclosure of FIG. 2, in accordance with at least one embodiment of the present disclosure.
Figure 5:
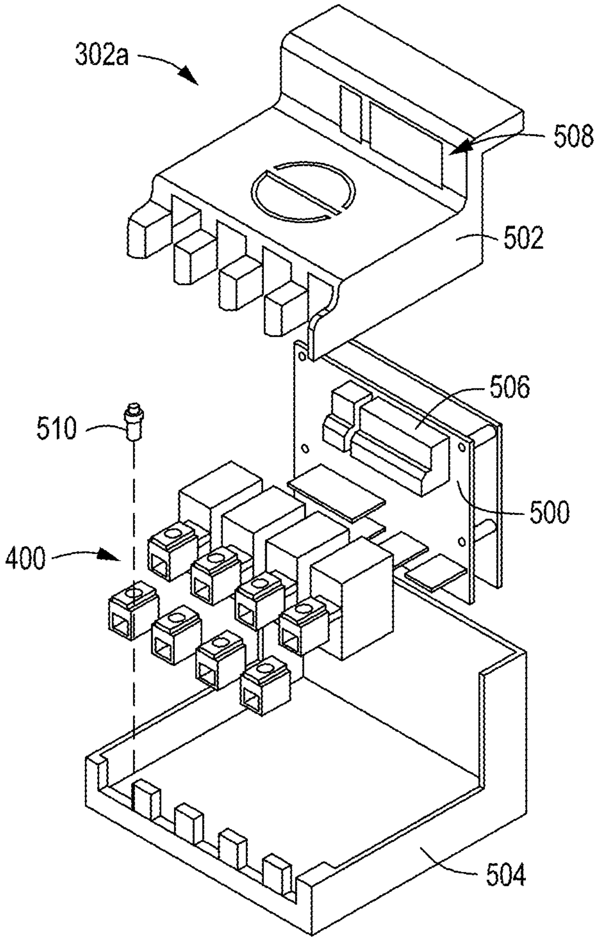
FIG. 5 is an exploded view of the smart relay module of FIG. 4, in accordance with at least one embodiment of the present disclosure.

FIG. 4 is a diagram of a SRM 300 configured for use with the load enclosure 200 of FIG. 2, and FIG. 5 is an exploded view of the SRM 300 of FIG. 4, in accordance with at least one embodiment of the present disclosure.

Each of the SRM 302*a*-302*c* (the SRM 302*a* is shown in FIG. 4) can comprise one or more single phase relays 400. For example, each of the SRM 302*a*-302*c* can comprise four single phase relays 400. For illustrative purposes, only the terminals 402 associated with each of the single phase relays 400 are shown. The single phase relays 400 can be configured to control a single phase, a split phase, and/or a three phase circuit. The SRM 302*a*-302*c* are configured to measure current, voltage, power, and/or energy for each relay load via one or more sensors (not shown). Each of the single phase relays 400 can be individually detachable for ease of field serviceability. In addition to four single phase relays 400, the SRM 302*a*-302*c* is configured to monitor eight additional circuits using a CT.

The load enclosure 200 facilitates ease of field serviceability of the SRM 302 *a*-302 *c*. For example, relay contacts wear out with usage and may require field replacement. The load enclosure 200 and the SRM 302 *a*-302 *c* allow each of the single phase relays 400 to be field replaceable via screw(s) 510 (one shown for illustrative purposes) that fits through the terminals 402 and screw into corresponding threaded apertures (not shown for clarity) disposed on the SRM 302 *a*-302 *c*. For example, each of the SRM 302 *a*-302 *c* can comprise a top (e.g., a header 502) and a bottom (e.g., a base 504) that are detachably connected to each other (FIG. 5), thus allowing easy access to each of the single phase relays 400. Additionally, an important field service consideration is turning off power (breaker) to one or more loads during field servicing. In accordance with the present disclosure, the terminals 402 of each of the single phase relays 400 are shielded from each other. Accordingly, power (breakers) needs to be turned off only for relays (and corresponding loads) that require field servicing, and breakers for other loads do not need to be turned off while servicing a particular relay. In at least some embodiments, software (e.g., via the tertiary control 112) is configured to indicate a relay state of health and/or send notification to a user (e.g., installer/homeowner) whenever a relay needs to be replaced.

Likewise, a PCBA 500 (e.g., a low voltage PCBA, FIG. 5), which receives control signals from the system controller 114, can be easily isolated and replaced without unwiring lugs or terminals. For example, in at least some embodiments, current transformer terminals 506 will have wires that terminate in an aperture 508 defined through the header 502 of the SRM 302*a*-302*c*. Thus, only the header 502 needs to be removed from the base 504, without a need for unwiring/rewiring of the PCBA 500 during field service.

Figure 6:
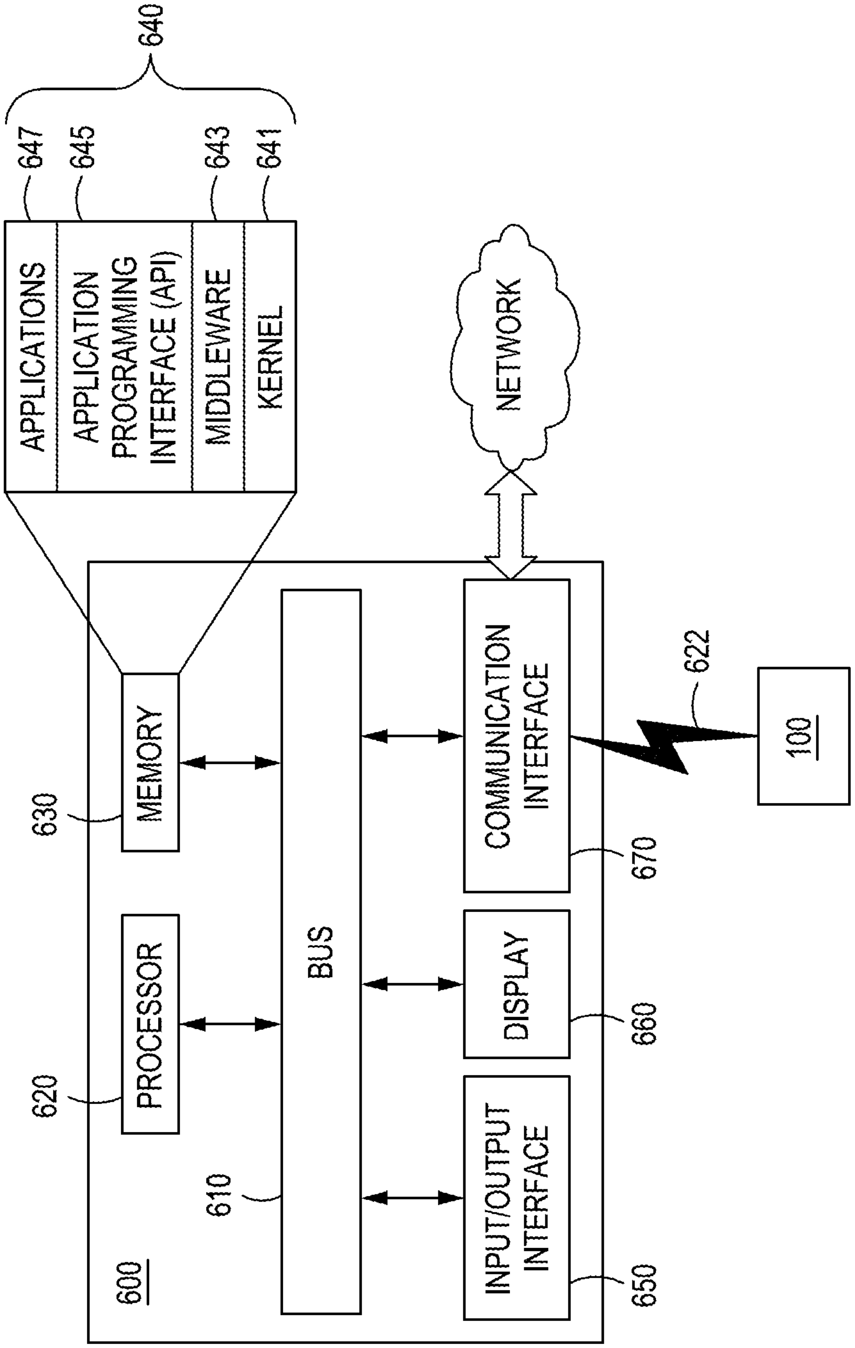
FIG. 6 is diagram of an electronic device configured for use with the energy management system of FIG. 1.

FIG. 6 is a block diagram of an electronic device 600 configured for use with the energy management system of FIG. 1, in accordance with at least one embodiment of the present disclosure. One or more of the components of the electronic device 600 can be a component of the devices of the energy management system (e.g., the storage system 108, the smart switch 110, the combiner 107, the one or more PVs 106 (e.g., solar panels), the system controller 114, the load controller 116, and/or the tertiary control 112.

The electronic device 600 includes a bus 610, a processor or processor 620, a memory 630 (or storage, e.g., non-transitory computer readable storage medium), an input/output interface 650, a display 660, and a communication interface 670. At least one of the above-described components may be omitted from the electronic device 600 or another component may be further included in the electronic device 600.

The bus 610 may be a circuit connecting the above-described components 620, 630, 650, 660, and 670 and transmitting communications (e.g., control messages and/or data) between the above-described components.

The processor 620 may include one or more of a central processing unit (CPU), an application processor (AP), and a communication processor (CP). The processor 620 can control at least one of the other components of the electronic device 600 and/or processing data or operations related to communication.

The memory 630 may include volatile memory and/or non-volatile memory. The memory 630 can store data or commands/instructions related to at least one of the other components of the electronic device 600. The memory 630 can store software and/or a program module 640. For example, the program module 640 may include a kernel 641, middleware 643, an API 645, application 647 (or applications, e.g., software-based application for allowing the energy management system 100 to operate as described herein). The kernel 641, the middleware 643 or at least part of the API 645 may be called an operating system.

The kernel 641 can control or manage system resources (e.g., the bus 610, the processor 620, the memory 630, etc.) used to execute operations or functions of other programs (e.g., the middleware 643, the API 645, and the applications 647). The kernel 641 provides an interface capable of allowing the middleware 643, the API 645, and the applications 647 to access and control/manage the individual components of the electronic device 600.

The middleware 643 may be an interface between the API 645 or the applications 647 and the kernel 641 so that the API 645 or the applications 647 can communicate with the kernel 641 and exchange data therewith. The middleware 643 is capable of processing one or more task requests received from the applications 647. The middleware 643 can assign a priority for use of system resources of the electronic device 600 (e.g., the bus 610, the processor 620, the memory 630, etc.) to the application 647. The middleware 643 processes one or more task requests according to a priority assigned to at least one application program, thereby performing scheduling or load balancing for the task requests.

The API 645 may be an interface that is configured to allow the applications 647 to control functions provided by the kernel 641 or the middleware 643. The API 645 may include at least one interface or function (e.g., instructions) for file control, window control, image process, text control, or the like. For example, during operation of the energy management system 100, the API 645 allows the applications 647 to display one or more user interfaces that allow a user to navigate, for example, through one or more screens to enter information associated with adding/subtracting one or more loads described above.

The input/output interface 650 is capable of transferring instructions or data received from a user or external devices to one or more components of an electronic device (e.g., one or more of the components of the energy management system 100). The input/output interface 650 is capable of outputting instructions or data, received from one or more components of the electronic device 600, to the user or external devices. The input/output interface 650 can be configured to create one or more GUIs for receiving a user input or an input from an electronic device (e.g., a user smart phone).

The display 660 may include a liquid crystal display (LCD), a flexible display, a transparent display, a light emitting diode (LED) display, an organic LED (OLED) display, micro-electro-mechanical systems (MEMS) display, an electronic paper display, etc. The display 660 can display various types of content (e.g., texts, images, videos, icons, symbols, etc.). The display 660 may also be installed with a touch screen. The display 660 can receive touches, gestures, proximity inputs or hovering inputs, via a stylus pen, or a user's body. Accordingly, the display 650 can be used to receive a user input on one or more GUIs.

The communication interface 670 can establish communication between the electronic device 600 and an external device (e.g., electronic device of the energy management system 100) connected to a network via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 622. Short-wireless communication 622 may include at least one of wireless fidelity (Wi-Fi), BT, BLE, Zigbee, near field communication (NFC), magnetic secure transmission (MST), etc. Wired communication may include at least one of universal serial bus (USB), high definition multimedia interface (HDMI), recommended standard, and plain old telephone service (POTS). The network may include at least one of a telecommunications network, e.g., a computer network (e.g., local area network (LAN) or WAN), the Internet, and a telephone network.

As noted above, the load controller 116 can be a component of the energy management system 100, or the load controller 116 can be configured to connect to one or more other existing energy management systems. For example, in at least some embodiments, the load controller 116 can be configured to connect to a storage system of an energy management systems (or broader systems).

Figure 7:
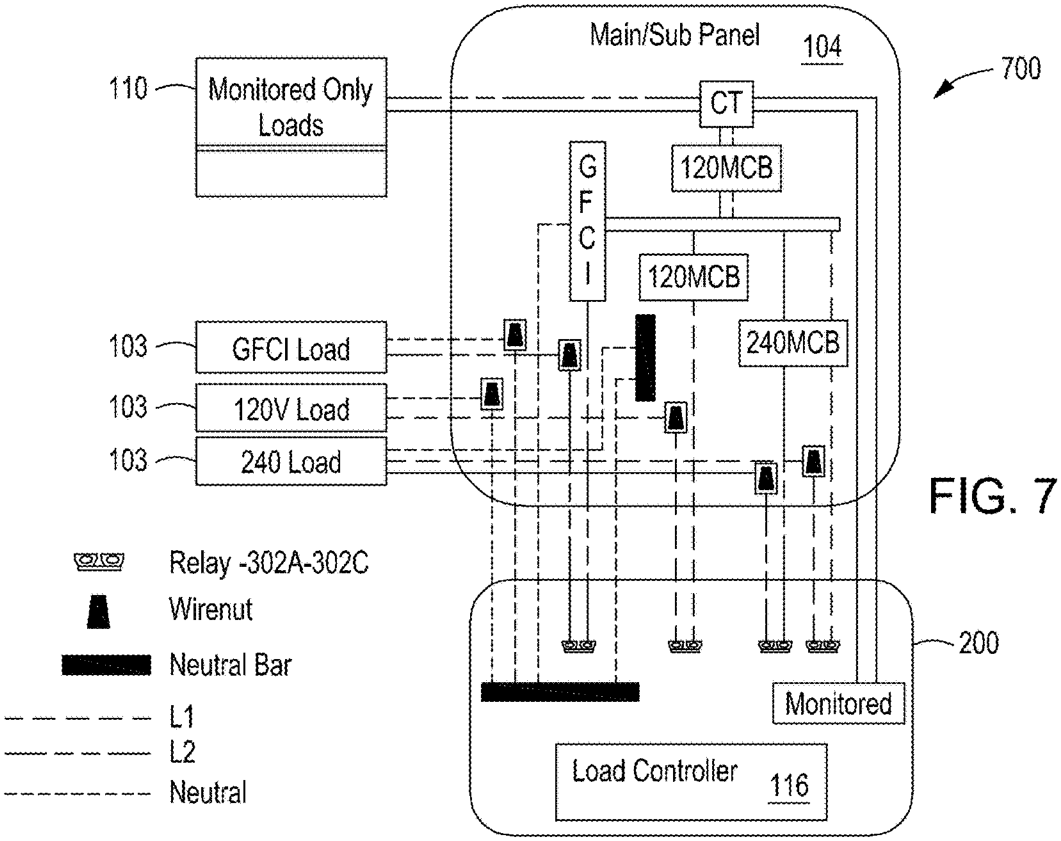
FIG. 7 is a diagram of a wiring configuration, in accordance with at least one embodiment of the present disclosure.
Figure 8:
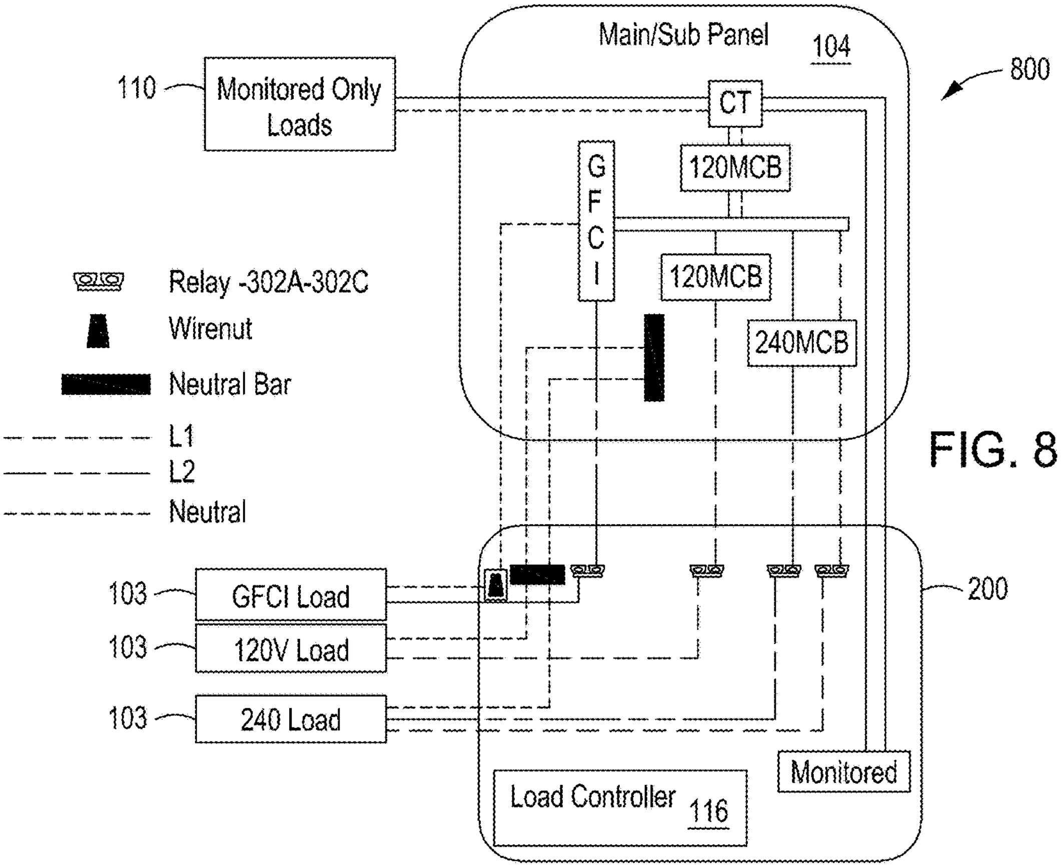
FIG. 8 is a diagram of a wiring configuration, in accordance with at least one embodiment of the present disclosure.

FIG. 7 and FIG. 8 are diagrams of wiring configurations, in accordance with embodiments of the present disclosure. For example, in at least some embodiments, the load controller 116 can be configured with at least two types of wiring configurations, excluding various neutral wire connections, which are not shown for simplicity.

For example, with reference to FIG. 7, a first connection method 700 comprises one or more load wires (e.g., GFCI load wire, 120V load wire, and/or a 240C load wire, etc.) that come off of a breaker in the main panel 104, into the load enclosure 200, through a relay, and back to the main panel 104 and are connected to one or more corresponding wires that go to one or more corresponding loads (e.g., GFCI load, 120V load, and/or a 240C load, etc.) from there (e.g., via wire-nut). In the first connection method 700, the current drawn by monitored only loads can be sensed by clamp-on CTs installed in the main panel 104. Additionally, wires can be used to bring the CT output into the load controller 116. In at least some embodiments, neutral conductors (e.g., of 240V circuits) need not be brought into the load controller 116, e.g., the load neutral conductors can be directly landed onto a neutral bar in the main panel 104.

Alternatively, with reference to FIG. 8, in a second connection method 800, one or more load wires (e.g., GFCI load wire, 120V load wire, and/or a 240C load wire, etc.) come off the breaker in the main panel 104, into the load enclosure 200, through a relay, and directly to one or more corresponding loads (e.g., GFCI load, 120V load, and/or a 240C load, etc.). Thus, unlike the first connection method 700, in the second connection method the load wire need not go back into the main panel 104. In the second connection method 800, the wires from the main panel 104 enter into the load controller 116 from one or more conduits and are routed to the loads through corresponding other one or more conduits. In the second connection method 800, as described above, the current drawn by monitored only loads can be sensed by clamp-on CTs installed in the main panel 104. Additionally, wires can be used to bring the CT output into the load controller 116.

While the foregoing is directed to embodiments of the present disclosure, other and further embodiments of the disclosure may be devised without departing from the basic scope thereof.

What is claimed is:

1. An apparatus for controlling one or more loads in an energy management system, comprising:
- a load controller operably connectable to a system controller, a combiner, a smart switch, and a storage system of the energy management system;
- a smart relay module comprising single phase relays and configured to control at least one of a single phase circuit, a split phase circuit, or a three phase circuit and configured to measure at least one of current, voltage, power, or energy for each relay load; and
- a load enclosure configured to house the load controller and the smart relay module and configured to receive wiring coming from a main panel of the energy management system and wiring coming from the system controller, combiner, smart switch, and storage system of the energy management system, wherein the system controller is configured to control loads and shed excess solar circuits.

2. The apparatus of claim 1, wherein the load enclosure comprises apertures configured to support cable entry from opposing sidewalls of the load enclosure or from a back wall of the load enclosure.

3. The apparatus of claim 1, wherein the load enclosure is at least one of a wall mount or a flush mount.

4. The apparatus of claim 1, wherein the load enclosure comprises a detachable lid with a shape that can be rotated as an orientation of the load enclosure is changed.

5. The apparatus of claim 1, wherein the load enclosure is further configured to support conduit entry for at least one of current transformer wiring, voltage transformer wiring, or power wiring.

6. The apparatus of claim 1, wherein the single phase relays comprise four single phase relays.

7. The apparatus of claim 1, wherein each of the single phase relays are field replaceable.

8. The apparatus of claim 1, wherein the load enclosure is further configured to receive current transformer (CT) conduits, voltage transformer conduits, power conduits (power wiring), or circuitry to control circuits of the energy management system using at least one of a current transformer or a voltage transformer.

9. The apparatus of claim 1, further comprising at least three smart relay modules.

10. The apparatus of claim 1, wherein the load controller is connected via conduit to the system controller and the storage system of the energy management system.

11. The apparatus of claim 10, wherein the load controller comprises a printed circuit board assembly (PCBA).

12. The apparatus of claim 11, wherein the smart relay module comprises an aperture in a header of the smart relay module, and wherein the aperture is configured to receive wires of current transformer terminals.

13. An energy management system, comprising:
- a storage system connected to a smart switch and a combiner of the energy management system and configured to provide backup power when the energy management system in an off-grid mode;
- a system controller configured to control of one or more loads when operating in the off-grid mode;
- a load controller connected to the storage system, the smart switch, the combiner, and the system controller;
- a smart relay module comprising single phase relays and configured to control at least one of a single phase circuit, a split phase circuit, or a three phase circuit and configured to measure at least one of current, voltage, power, or energy for each relay load; and
- a load enclosure configured to house the load controller and the smart relay module and configured to receive wiring coming from a main panel of the energy management system and wiring coming from the system controller, a combiner, a smart switch, and the storage system of the energy management system; wherein the system controller is configured to control loads and shed excess solar circuits.

14. The energy management system of claim 13, wherein the load enclosure comprises apertures configured to support cable entry from opposing sidewalls of the load enclosure or from a back wall of the load enclosure.

15. The energy management system of claim 14, wherein the load enclosure is at least one of a wall mount or a flush mount.

16. The energy management system of claim 13, wherein the load enclosure comprises a detachable lid with a shape that can be rotated as an orientation of the load enclosure is changed.

17. The energy management system of claim 13, wherein the load enclosure is further configured to support conduit entry for at least one of current transformer wiring, voltage transformer wiring, or power wiring.

18. The energy management system of claim 13, wherein the single phase relays comprise four single phase relays.

* * * * *